United States Patent
van Thiel (10) Patent No.: US 12,018,976 B2
(45) Date of Patent: Jun. 25, 2024

(54) METHOD FOR DETERMINING A MASS OF A SELF-DRIVING VEHICLE, CENTRAL CONTROL UNIT AND SELF-DRIVING VEHICLE

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

(*) Notice: Subject to any disclaimer, the term of this patent is extended or adjusted under 35 U.S.C. 154(b) by 0 days.

(21) Appl. No.: 18/482,669

(22) Filed: Oct. 6, 2023

(65) Prior Publication Data

US 2024/0053187 A1    Feb. 15, 2024

Related U.S. Application Data

(63) Continuation of application No. PCT/EP2022/062093, filed on May 5, 2022.

(30) Foreign Application Priority Data

May 11, 2021    (DE) ..................... 10 2021 112 239.2

(51) Int. Cl.
  *G01G 19/08*    (2006.01)
(52) U.S. Cl.
  CPC .................................. *G01G 19/086* (2013.01)
(58) Field of Classification Search
  CPC .............................. G01G 19/086; B60W 40/13
  See application file for complete search history.

(56) References Cited

U.S. PATENT DOCUMENTS 6,446,024 B1    9/2002  Leimbach et al.
6,633,006 B1 *  10/2003  Wolf ....................... B60T 8/172
                                                    177/136

(Continued)

FOREIGN PATENT DOCUMENTS

DE          197 28 769 A1    1/1999
DE      10 2008 037 083 A1   11/2009
(Continued)

OTHER PUBLICATIONS

English translation and Written Opinion of the International Searching Authority dated Aug. 5, 2022 for international application PCT/EP2022/062093 on which this application is based.

(Continued)

*Primary Examiner* — Natalie Huls
(74) *Attorney, Agent, or Firm* — Walter Ottesen, P.A.

(57) ABSTRACT

A method determines a vehicle mass of a self-driving vehicle, wherein an internal force can be exerted on the self-driving vehicle by the automated control of an electronic drive system and/or an electronic braking system. The method includes determining whether a trigger event is present indicating a change in vehicle mass is likely, and activating a learning operating mode in the presence of a trigger event wherein the self-driving vehicle is operated alternately in a first and a second phase. In the first phase, an internal force is exerted on the self-driving vehicle, and in the second phase, an internal force is exerted on the self-driving vehicle. A disturbing force acting in the phases is determined. The vehicle mass is determined depending on the vehicle acceleration and the internal force present in each phase, as well as depending on the determined disturbing force.

16 Claims, 2 Drawing Sheets

(56) References Cited

U.S. PATENT DOCUMENTS

| | | | |
|---|---|---|---|
| 9,500,514 B2* | 11/2016 | Roos | G01G 19/086 |
| 2014/0121912 A1 | 5/2014 | Mair et al. | |
| 2014/0172253 A1* | 6/2014 | Palmer | F16H 61/0213 |
| | | | 701/56 |
| 2016/0121903 A1 | 5/2016 | Flaum et al. | |

FOREIGN PATENT DOCUMENTS

| | | |
|---|---|---|
| DE | 10 2012 219 699 A1 | 4/2014 |
| DE | 10 2017 001 911 A1 | 8/2018 |
| DE | 10 2017 108 034 A1 | 10/2018 |
| DE | 10 2019 103 968 A1 | 8/2020 |
| EP | 2 215 438 B1 | 8/2010 |
| EP | 3 003 814 B1 | 4/2016 |
| EP | 3 084 371 B1 | 10/2016 |
| GB | 2 576 800 A | 3/2020 |

OTHER PUBLICATIONS

International Search Report of the European Patent Office dated Aug. 5, 2022 for international application PCT/EP2022/062093 on which this application is based.

* cited by examiner

METHOD FOR DETERMINING A MASS OF A SELF-DRIVING VEHICLE, CENTRAL CONTROL UNIT AND SELF-DRIVING VEHICLE

CROSS-REFERENCE TO RELATED APPLICATIONS

This application is a continuation application of international patent application PCT/EP2022/062093, filed May 5, 2022, designating the United States and claiming priority from German application 10 2021 112 239.2, filed May 11, 2021, and the entire content of both applications is incorporated herein by reference.

TECHNICAL FIELD

The disclosure relates to a method for determining a vehicle mass of a self-driving vehicle, in particular of a commercial vehicle, a central control unit for carrying out the method, and a self-driving vehicle with such a central control unit.

BACKGROUND

The availability of the most accurate vehicle mass of a self-driving vehicle, including at least one towing vehicle and, if applicable, at least one trailer or semi-trailer, is of great importance for precise and safe planning and control of the target trajectory on which the autonomously operated vehicle is to move or is moving. In order to estimate the vehicle mass, a mass estimation algorithm is usually provided in a central brake control system of an electronic braking system of the self-driving vehicle. Depending on the estimated vehicle mass, settings are then set in the brake management system of the electronic braking system and, in particular, decisions are made for threshold values of an RSC system (RSC, Roll Stability Control). The drive management of the self-driving vehicle is also based on the estimated vehicle mass.

The estimation of the vehicle mass is conventionally carried out according to Newton's second law (F=M×A) while driving, wherein the internal force (F), a driving force or a braking force, for example, follows from an engine torque, taking into account other vehicle parameters (for example a number of vehicle axles) as well as the losses in the drive train or from the brake management system, and the vehicle acceleration (A) is derived from a wheel revolution rate of the wheels. Since the internal force in particular, but also the acceleration depends on a number of unobserved influencing factors, this determination of the vehicle mass is subject to inaccuracies, wherein interference variables or disturbing forces can only be estimated in specific driving situations.

For example, in DE 10 2008 037 083 A1 it is provided to determine the vehicle mass from a measured brake pressure and a measured vehicle acceleration (deceleration), so that only a few error-prone parameters are used. EP 2 215 438 B1 provides for estimating a vehicle mass based on weight classes in which the vehicle falls with the current load. US 2016/0121903 also provides for estimating the vehicle mass taking into account the power rating as a function of kinetic energy and drive power. It is planned to determine the speed and drive power of the vehicle at two times in succession in order to be able to solve the power rating even with unknown driving resistances (incline, rolling resistance, air resistance) and thus to exclude unknown inaccuracies.

In addition, a continuous mass determination is normally provided, since no trigger events indicating a change in vehicle mass, in particular a change in load in commercial vehicles, are available or are not specifically used, especially in manually operated vehicles. Therefore, in previous systems, it is continuously assumed that the vehicle mass could have changed, so that an up-to-date mass determination is also carried out on an ongoing basis.

In order to avoid this, DE 10 2019 103 968 A1 provides for the use of a seat occupancy or a seat belt being secured as operating information of the vehicle in order to conclude that there is a trigger event for the change in a vehicle mass. In this case, the vehicle mass is determined again. DE 10 2017 001 911 A1 also provides for comparing a seat occupancy and/or a tank filling and/or a pitch angle of the vehicle before and after a stop and correcting the mass in the event of a significant deviation. An estimation of inaccuracies or disturbing forces does not take place. Based on the determined trigger event, only the vehicle mass is determined again according to known algorithms.

SUMMARY

Based on this, an object of the disclosure is to specify a method for estimating a vehicle mass of a self-driving vehicle with which the vehicle mass can be estimated accurately and with little effort. The object of the disclosure is also to specify a central control unit and a self-driving vehicle.

According to the disclosure, a method for determining a vehicle mass of a self-driving vehicle operating at least at an automation level of 4 or higher (according to the SAE J3016 standard) is therefore provided, wherein in the case of a trigger event indicating a probable change in the vehicle mass, a learning operating mode is specifically activated, wherein the self-driving vehicle is specifically operated in the learning operating mode, for example for fixed periods of time, alternately in a first phase and in a second phase, wherein by automated control of the electronic drive system and/or the electronic braking system:

in the first phase, an internal force with a first force value, preferably a driving force, is exerted on the self-driving vehicle via the electronic drive system or a deceleration force is exerted on the self-driving vehicle via the electronic braking system, and in the second phase, an internal force with a second force value is exerted on the self-driving vehicle, wherein the first force value is different from the second force value; and determining a disturbing force acting in the phases, wherein the disturbing force differs from the internal force, which is actively caused, for example by the drive or the brakes of the vehicle; and determining the vehicle mass depending on the vehicle acceleration and the internal force that are present in each phase, as well as depending on the determined or estimated disturbing force. Under certain circumstances, the disturbing force can be zero if no interference is acting on the self-driving vehicle in the respective phases.

According to the disclosure, a central control unit for carrying out the method according to the disclosure as well as a self-driving vehicle with such a central control unit as well as an electronic braking system and an electronic drive system in which the method according to the disclosure can be used are also provided.

It is therefore advantageous to use the sensor density and thus the information density in a self-driving vehicle that is operated at least at the autonomy level 4 in order to first determine or evaluate whether the self-driving vehicle could have changed its vehicle mass during operation. With this evaluation or the presence of a trigger event, a learning operating mode can then be specifically initiated or activated in order to determine the vehicle mass of the self-driving vehicle as accurately as possible. This allows good planning of the target trajectory, which is determined depending on the vehicle mass. But even in the current driving situation, unstable driving conditions can be determined more accurately and reliably and reacted to if the exact vehicle mass is known.

Since the vehicle mass is only estimated after the trigger event, the processing effort is minimized. According to the disclosure, it is exploited that the last determined vehicle mass in a self-driving vehicle cannot be constantly validated or checked for a change. As a result of the high density of sensors in a self-driving vehicle, sufficient operating information is available that can indicate a change in the vehicle mass, so that only then is a new determination of the vehicle mass to actually be carried out. Continuous doubt about the validity of the vehicle mass is therefore not necessary in a self-driving vehicle. Nevertheless, it may be provided that at least a plausibility check of the vehicle mass takes place at regular intervals even in the driving mode, but this is not carried out by a specific intervention in the electronic braking system and/or electronic drive system, but "incidentally" during the normal driving mode.

In the learning operating mode, the driving behavior of the vehicle is set in the alternating first and second phases in such a way that unknown or undetermined or indeterminable interference variables or disturbing forces can be estimated and on the basis of these a mass determination can be carried out as accurately as possible. This takes advantage of the fact that the learning operating mode in a self-driving vehicle can be installed in a targeted or appropriate manner in the driving process by a central control unit without overriding by a manual driver or another automated instance. Therefore, the activation of the learning operating mode, in which selective switching is carried out between the first and second phases, does not interfere with the normal operation of the self-driving vehicle in a driving operating mode and vice versa.

It is preferably provided that the first force value in the first phase or the second force value in the second phase is set to zero, so that in the first phase or in the second phase only a disturbing force acts on the self-driving vehicle. In this way, in the respective phase in which an internal force is specifically set to zero, that is, no drive power or no deceleration power is acting, it is possible to estimate directly from the vehicle reaction then present, in particular the vehicle acceleration then present, the disturbing forces that are acting on the self-driving vehicle, since these alone then cause a vehicle acceleration. This enables a simple quantitative estimation of the disturbing forces, which can then be used for mass estimation in the other phase.

Preferably, it is also provided that automated control of the electronic drive system and/or the electronic braking system is carried out when the learning operating mode is activated to set a first force value or a second force value of zero in the respective phase in such a way that a drive train of the self-driving vehicle is open, for example by a specific disengagement, and/or any brakes of the self-driving vehicle are released. Accordingly, vehicle acceleration is only changed by disturbing forces, in particular forces acting on the self-driving vehicle from the outside, for example a downhill downforce, air resistance, et cetera, or forces acting in the self-driving vehicle, for example internal frictional forces of the drive components or a static friction force on the road. In this simple way, a passive driving state can be specifically created in order to estimate the disturbing forces in the respective phase, for example from the vehicle acceleration that is acting then.

In the first phase, a first acceleration value for the vehicle acceleration is set due to the setting of the first force value and the presence of a disturbing force, and in the second phase, a second acceleration value for the vehicle acceleration is set due to the setting of the second force value and the presence of a disturbing force. The respective force and acceleration values, except for the disturbing force, can be easily determined in the respective phase via corresponding sensors in the vehicle or provided by the respective control units of the electronic drive system or brake system in the self-driving vehicle, so that no additional sensor system is necessary.

On this basis, it is also provided that, for the purpose of determining the mass of the vehicle, an average mass value characterizing the vehicle mass will be determined from individual mass values, wherein at least one individual mass value is assigned to each phase in which the first force value and/or the second force value is non-zero, wherein the individual mass values result from the first force value or second force value present in the respective phase and the first or second acceleration value present in the respective phase value, taking into account a disturbing force value and preferably from Newton's second law.

Therefore, a vehicle mass can be determined in a simple way using force values and acceleration values determined in the respective phases, for example by averaging, which also takes into account the disturbing forces acting in the respective phases, which makes the mass determination more accurate. Preferably, in the case of a phase with a force value of zero, the disturbing force value follows directly from the vehicle acceleration present in this phase and in the case of alternating first and second phases without a force value of zero by comparing the vehicle accelerations present in the respective phases, since the disturbing force has an equal influence on the vehicle acceleration in both phases.

Preferably, it is also provided that an individual mass value is determined depending on a disturbing force value that characterizes the disturbing force in a phase immediately preceding the phase associated with the individual mass value. Therefore, the individual mass values are calculated based on a disturbing force that is highly likely to still be present in the respective associated phase. This makes the determination of the individual mass values more accurate overall.

Preferably, it is also provided that the learning operating mode remains activated until individual mass values associated with different phases are within a tolerance value around the mean mass value. As a result, deviations that occur, for example due to temporary disturbing forces, such as brief gusts of wind or short road inclinations, can be filtered out, as these are less significant when averaging over a longer period of time.

Preferably, it may also be provided that the learning operating mode remains activated until disturbing force values determined in different phases deviate from each other by less than a limit value. Therefore, the determined disturbing forces can also be directly compared with each other in order to determine whether only short-term disturbing forces occur and, in this case, to extend the learning operating mode.

Preferably, it is provided that the learning operating mode remains activated for at least two first phases and at least two second phases that alternate. With this number of first and second phases, at least a reliable determination of the vehicle mass is possible, taking into account the disturbing forces.

Preferably, it is also provided that the determination of whether a trigger event is present is carried out depending on the operating information of the self-driving vehicle, wherein the operating information contains at least one element selected from:

- trailer status change information indicating whether a trailer coupling of the self-driving vehicle has been changed over between an open position and a closed position in order to deduce whether the vehicle mass is likely to have changed due to the coupling or uncoupling of a trailer, and/or
- loading opening status change information indicating whether a loading opening to a load compartment of the self-driving vehicle has been opened or closed in order to deduce whether the vehicle mass has changed with a high probability due to loading or unloading of a load via the respective loading opening; and/or
- level change information indicating whether a distance between at least one of the vehicle axles and a vehicle frame of the self-driving vehicle has changed in order to deduce whether the vehicle mass has changed with a high degree of probability due to a change in the load on the vehicle frame; and/or
- loading plan information indicating whether and when a load should be picked up or delivered by the self-driving vehicle as planned, in order to deduce whether the mass of the vehicle has changed with a high degree of probability due to, for example, loading or unloading planned by the fleet operator; and/or
- loading activity information indicating whether loading activities are being carried out in an environment of the self-driving vehicle, for example via a sensor arrangement that has, for example, a camera that can be used to perceive loading activities of for example people and/or industrial trucks in the vicinity in order to deduce whether the vehicle mass has changed with a high probability due to loading or unloading; or
- load loss information indicating whether an unintentional loss of load was perceived by the self-driving vehicle, for example while driving, wherein this is carried out, for example, via a sensor arrangement that has, for example, a camera that can detect a loss of load from the self-driving vehicle in order to deduce whether the vehicle mass has changed with a high degree of probability due to a lost load; and/or
- remote information indicating whether a self-driving vehicle has wirelessly communicated receipt or delivery of a load via a cloud system or other remote wireless system in order to deduce whether there is a high probability that the mass of the vehicle has changed due to loading or unloading; and/or
- position information indicating whether the self-driving vehicle is away from public road traffic, for example at a depot, in order to deduce whether the vehicle mass has changed with a high degree of probability due to loading or unloading, in particular insofar as the current position of the self-driving vehicle indicates the possibility of loading or unloading.

Therefore, a range of operating information is available in the self-driving vehicle, which can be used alone or in combination with each other to infer a trigger event. Preferably, it is provided that the operating information is used to evaluate whether a change in the mass of the vehicle is likely and to issue a trigger signal when the operating information has determined that a change in the mass of the vehicle is likely, and the trigger signal is used to determine whether a trigger event is present.

BRIEF DESCRIPTION OF DRAWINGS

The invention will now be described with reference to the drawings wherein.

DETAILED DESCRIPTION

Figure 1:
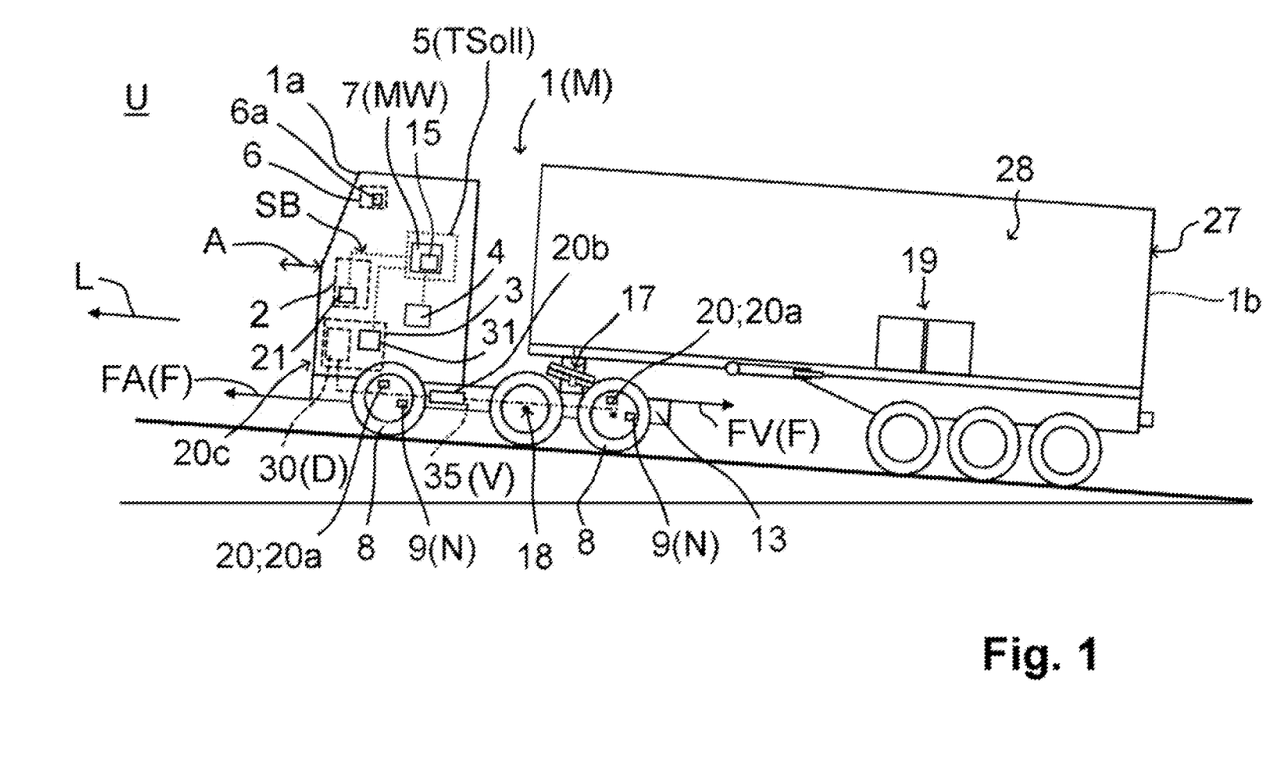
FIG. 1 shows a schematic view of a vehicle.

FIG. 1 schematically shows an autonomously operated or self-driving vehicle 1, which includes a towing vehicle 1a and a trailer 1b. It is envisaged here that the self-driving vehicle 1 will be operated at an automation level 4 or higher (according to the SAE J3016 standard), that is, a driver does not necessarily have to be present or attentive. In principle, the self-driving vehicle 1 can also be a one-piece vehicle or, as a multi-part vehicle, includes a towing vehicle 1a with one or more trailers (drawbar trailer, et cetera) or semi-trailer 1b.

The self-driving vehicle 1 has an electronic braking system 2, an electronic drive system 3 and an electronic steering system 4, which can be used to brake, drive or steer the self-driving vehicle 1 in an automated manner. For the control of the individual electronic systems 2, 3, 4, a central control unit 5 (virtual driver) is provided, which is configured to determine and/or read in a target trajectory TSoll and to guide the self-driving vehicle 1 along this target trajectory TSoll by controlling the electronic systems 2, 3, 4 in a driving operating mode FB.

Furthermore, the self-driving vehicle 1 has a mass estimation unit 7 arranged in the towing vehicle 1a, for example, which is configured to estimate a vehicle mass M of the self-driving vehicle 1 and to output a corresponding mass estimate MW. In the present case, the vehicle mass M refers to the entire self-driving vehicle 1 including any vehicle parts (towing vehicle 1a and trailer 1b or other trailers/semi-trailers). For example, the mass estimation unit 7 can be integrated into the central control unit 5, for example as software or an algorithm. Equally effectively, the mass estimation unit 7 may also be connected to the central control unit 5 in a signal-conducting manner and/or integrated into one of the electronic systems 2, 3, 4, so that the mass estimate MW can also be transferred externally to the central control unit 5.

The central control unit 5 may use the mass estimate MW in particular to determine the target trajectory TSoll and/or also when driving along the target trajectory TSoll in order to avoid stability-critical situations in the autonomous driving mode in anticipation and/or in the current driving situation. In order to ensure the best possible planning in the fully automated driving mode and also to be able to accurately evaluate the current driving situation with regard to driving stability, the vehicle mass M must be determined as accurately as possible by the mass estimation unit 7.

The mass estimation unit 7 estimates the vehicle mass M on the basis of Newton's second law F=M×A, where F is an internal force with which the self-driving vehicle 1 is driven or decelerated in order to accelerate the vehicle mass M with a vehicle acceleration A (positive or negative) oriented in the longitudinal direction L of the self-driving vehicle 1. Therefore, either a driving force FA or a deceleration force FV, which also influence the internal force F in the above formula, can act on the self-driving vehicle 1.

In the driven case, for example, the driving force FA results from an engine torque D generated by the drive 30 of the electronic drive system 3, taking into account losses V normally occurring in a drive train 35 of the self-driving vehicle 1, which are preferably known. The engine torque D or a related variable can be transmitted, for example from a drive controller 31 (engine electronics) of the electronic drive system 3, to the mass estimation unit 7 in the central control unit 5, for example via a data bus of the self-driving vehicle 1. Depending on this, taking into account the known losses V in the drive train 35, this can determine a (positive) force value FW, which characterizes the driving force FA in the driven case.

In the braked case, the deceleration force FV or a (negative) force value FW results, for example, from the control times of the individual brakes 20 (service brake 20*a*, continuous brake 20*b*, engine brake 20*c*, et cetera) generated in a brake control system 21 of the electronic brake system 2 and/or from brake signals SB that are output from the brake control system 21 of the electronic brake system 2 to the individual brakes 20 to brake the self-driving vehicle 1 as requested. For this reason, variables characterizing the current deceleration force FV can also be transmitted from the brake control system 21, for example via the data bus, to the mass estimation unit 7 in the central control unit 5.

The vehicle acceleration A can be characterized by an acceleration value AW, which results, for example, depending on calculated wheel accelerations A8 of the individual wheels 8 of the self-driving vehicle 1. For this purpose, wheel revolution rate sensors 9 on the respective wheels 8 of the self-driving vehicle 1 determine the wheel revolution rates N individually and the individual wheel accelerations A8 are calculated by mathematical derivation. The vehicle acceleration A or the acceleration value AW then follows, for example, by forming an average value (arithmetic mean) over all or some wheels 8.

The vehicle mass M is estimated in the mass estimation unit 7, for example by continuously adding individual mass values MWi, with i=1, 2, 3, . . . p (p=number of individual values), which result from the current driving situation using the formula M=F/A. Subsequently, a mean mass value MWM (arithmetic mean) is formed from the individual mass values MWi determined at different times t, wherein the mean mass value MWM indicates the mass estimate MW to be output. As a result of the averaging, the mass estimate MW approaches the actual vehicle mass M of the self-driving vehicle 1 with an increasing number p of individual mass values MWi.

Figure 2:
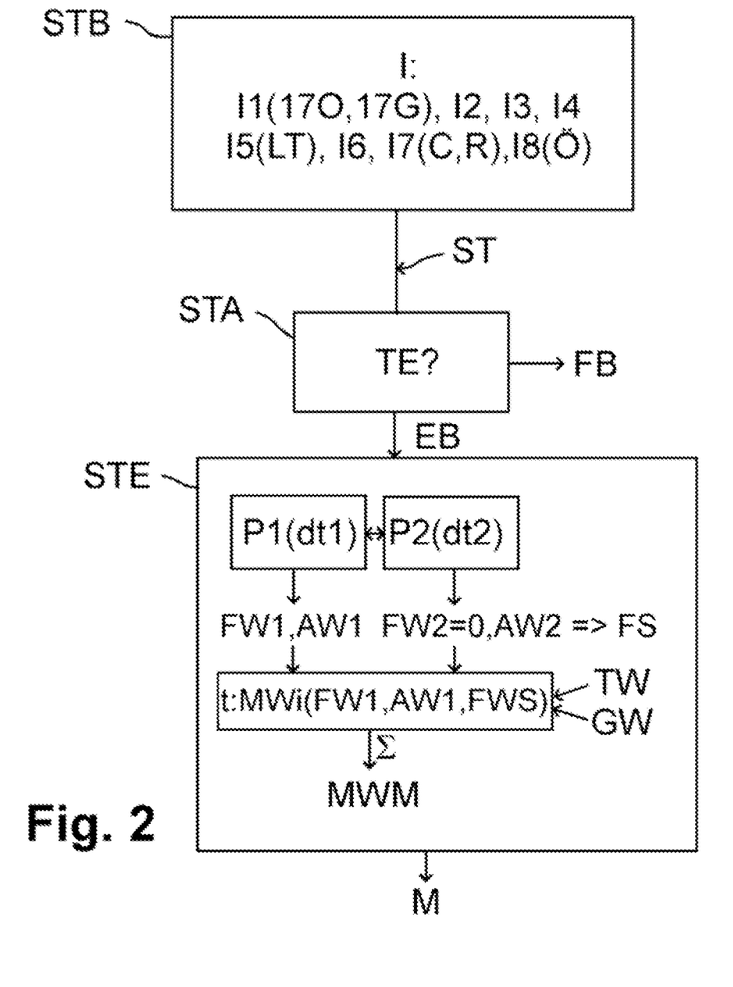
FIG. 2 shows a flowchart of the method according to the disclosure.

In order to carry out this determination process as accurately as possible, the individual mass values MWi are determined in a learning operating mode EB, which can be specifically set or activated by the central control unit 5 in an activation step STA if a trigger event TE is present, which will be explained in more detail later. If this is not the case, the self-driving vehicle 1 will continue to be operated in the driving mode FB. In the learning operating mode EB, the first phases P1 and the second phases P2 alternate in a targeted manner, wherein the central control unit 5 selectively controls the electronic drive system 3 and/or the electronic braking system 2 in accordance with FIG. 3 in the first periods dt1 for setting the first phases P1 and in the second periods dt2 for setting the second phases P2 or specifically suspends control.

Figure 3:
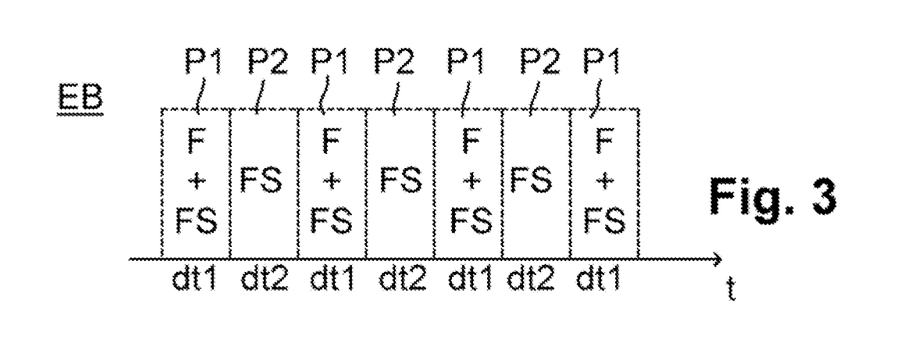
FIG. 3 shows a chronological overview of the learning operating mode.

In the first phase P1, the self-driving vehicle 1 is actively driven with a defined internal force F, that is, a driving force FA or a deceleration force FV, via the drive 30 or actively decelerated via the respective brakes 20 (service brakes 20*a*, continuous brakes 20*b*, engine brakes 20*c*, et cetera). In the first phase P1 there is therefore a certain first force value FW1 characterizing the internal force F. In the second phase P2, the self-driving vehicle 1 is also operated with a defined internal force F, wherein in the second phase P2 there is a certain second force value FW2 characterizing the internal force F, which explicitly differs from the first force value FW1. The self-driving vehicle 1 is therefore operated differently in both phases P1, P2, wherein in the first phase P1 a first acceleration value AW1 is set characterizing the vehicle acceleration A in this first phase P1 and in the second phase P2 a second acceleration value AW2 is set characterizing the vehicle acceleration A in this second phase P2.

In a preferred embodiment, the second force value FW2 in the second phase P2 is zero, that is, the self-driving vehicle 1 is not actively driven by the drive 30 or actively braked by the respective brakes 20 in the second phase P2. For this purpose, the drive control system 31 or the electronic drive system 3 and/or the brake control system 21 or the electronic brake system 2 are controlled by the central control unit 5 in the second phase P2 in such a way that, for example, the drive train 35 is opened by disengaging the clutch or the respective brakes 20 are released.

In the second phase P2, therefore, according to the preferred embodiment a defined driving state is created in which the vehicle acceleration A of the self-driving vehicle 1 changes only depending on unknown disturbing forces FS, insofar as such are present. If, for example, there is a vehicle acceleration A or a second acceleration value AW2 not equal to zero in the second phase P2, a (positive or negative) disturbing force FS or a disturbance variable characterizing it can be derived, which is responsible for the change in movement (driving or decelerating) of the self-driving vehicle 1 in the second phase P2.

A disturbing force FS (positive or negative) can be caused, for example, due to a slope (descent, ascent) along which the self-driving vehicle 1 is moving, or the action of wind (from the front or rear) or other external forces acting on the self-driving vehicle 1. Furthermore, disturbing forces FS can also be frictional forces that act, for example, on the moving drive components in the self-driving vehicle 1 and/or that act on the road surface due to a certain tire condition (static friction forces). These disturbing forces FS can either not be determined at all or not always exactly by sensors in the self-driving vehicle 1. However, the second phase P2 with a defined second force value FW2 of zero allows a direct estimation of these disturbing forces FS, which can be processed into a corresponding disturbance force value FWS by the mass estimation unit 7.

In the first phase P1, a driving condition is created in which the vehicle acceleration A of the self-driving vehicle 1 changes as a result of the known or defined internal forces F or the defined first force values FW1 (positive or negative) due to the drive 30 or the brakes 20, but also depending on the unknown disturbing forces FS, if any. Assuming that the disturbing forces FS do not change significantly in the immediately successive phases P1, P2, the disturbing forces FS directly determined or estimated in the second phase P2 or the disturbing force value FWS estimated in the determination step STE, in which the individual mass values MWi are estimated for different times t on the basis of the first force values FW1 and the first acceleration values AW1 available in the first phase P1, can be specifically taken into account. Thus, in the determination step STE, the individual mass values are determined, for example, via MWi=(FW1+FWS)/AW1, that is, from the vehicle acceleration A of the self-driving vehicle 1 caused by the known and unknown forces F, FS.

If the second force value FW2 in the second phase P2 is not zero, the disturbing force FS cannot be estimated directly from the second acceleration value AW2, but at least from the difference between the first acceleration value AW1 in the first phase P1 and the second acceleration value AW2 in the second phase P2, taking into account the respective set force values FW1, FW2, although again it is assumed that the disturbing forces FS in the two phases P1, P2 are approximately identical. Therefore, the determination of the disturbing forces FS or a disturbing force value FWS follows after a first and a second phase P1, P2 have been run through at least once.

Via multiple targeted changeovers between the first phase P1 and the second phase P2 by the central control unit 5, rapidly changing disturbing forces FS, such as temporary gusts of wind, can also be detected and taken into account. If the individual mass values MWi, which have been determined over several successive first phases P1 or second phases P2, in which the second force values FW2 are non-zero, on the basis of the disturbing forces FS from the respective previous phases P1, P2, differ from each other for example by a certain tolerance value TW, the learning operating mode EB can be extended accordingly until the individual mass values MWi are within a certain tolerance or the mass dispersion is minimized. According to an alternative with the same effect, the estimated disturbing forces FS from successive phases P1, P2 can also be compared with each other and, in the event of deviations above a limit value GW, an extension of the learning operating mode EB can be provided. As a result, short-term disturbing forces FS, which act only in the second phase P2 and not completely in the first phase P1 (or vice versa), are filtered out. This makes the mass determination more accurate overall.

In contrast to a manual driving mode, for example at autonomy level 2, the activation of the learning operating mode EB by the central control unit 5 can be carried out in such a way that there is no unwanted or disturbing reaction on normal driving operation, since it can be scheduled accordingly by the virtual driver or the central control unit 5 and no overriding normally takes place during this time, which simplifies the learning process overall.

As already mentioned, the learning operating mode EB is only activated in the activation step STA if a trigger event TE is present. This is the case, for example, if a change in the vehicle mass M has been classified as probable in an evaluation step STB by an evaluation unit 15, which can be integrated in the mass estimation unit 7, for example. If this is the case, a trigger signal ST can be output from the evaluation unit 15, whereupon the central control unit 5 activates the learning operating mode EB in the activation step STA and implements the respective phases P1, P2 alternately as described above by electrically controlling the electronic systems 2, 3, 4 in the respective periods dt1, dt2.

In the evaluation step STB, the evaluation unit 15 uses operating information I, for example, which is detected and used for the operation of the self-driving vehicle 1 anyway and is therefore available without restriction, to determine whether a change in the vehicle mass M is likely or whether a trigger event TE is present. This operating information I can be, for example:

trailer status change information I1, which indicates whether a trailer coupling 17 (fifth wheel, drawbar coupling, et cetera) of the self-driving vehicle 1 has been changed between an open position 17O and a closed position 17G (or vice-versa), from which it can be deduced that the vehicle mass M has changed with a high degree of probability due to coupling or uncoupling of the trailer 1b; or loading opening status change information I2 indicating whether a loading opening 27, for example a loading door, a rolling door, et cetera to the load space 28 has been opened and/or closed, from which it can be deduced that the vehicle mass M has changed with a high degree of probability due to the loading or unloading of a load 19 via the respective loading opening 27; or level change information I3 indicating whether a distance between at least one of the vehicle axles 18 and a vehicle frame 13 of the self-driving vehicle 1 has changed, from which it can be deduced that the vehicle mass M has changed with a high degree of probability due to a change in the load on the vehicle frame 13; or loading plan information I4 indicating whether and when there should be a scheduled pick-up or delivery of a load 19 by the self-driving vehicle 1, from which it can be deduced that the vehicle mass M has changed with a high degree of probability due to a planned loading or unloading; or loading activity information I5 indicating whether loading activities LT are perceived in the vicinity U of the self-driving vehicle 1, wherein this can be carried out, for example, via sensors of a sensor arrangement 6, which, for example, has a camera 6a as a sensor that can perceive the loading activities LT of for example persons and/or forklift trucks, from which it can be deduced that the vehicle mass M is highly likely to have changed due to load or unloading; or load loss information I6 indicating whether an unintentional loss of load 19 was perceived, for example while driving, wherein this can be carried out, for example, via sensors of a sensor arrangement 6 in the self-driving vehicle 1 which has, for example, a camera 6a as a sensor that can detect a loss of load 19, from which it can be deduced that the vehicle mass M has changed with a high degree of probability due to a lost load 19; or remote information I7 indicating whether the pick-up or delivery of load 19 has been communicated wirelessly via a cloud system C or another wireless remote system R, from which it can be deduced that the vehicle mass M has changed with a high probability due to loading or unloading; or position information I8 indicating whether the self-driving vehicle 1 is away from public road traffic Ö, for example at a depot, from which it can be deduced that the vehicle mass M has changed with a high probability due to loading or unloading, in particular insofar as the current position indicates a possibility of loading or unloading.

Depending on the respective operating information I that is available to the evaluation unit 15 and that is provided, for example, via corresponding signals in the self-driving vehicle 1, the probability of a change in the vehicle mass M is evaluated in the evaluation step STB and then a trigger signal ST is output if the evaluation indicates a mass change event or a significant or relevant change in the vehicle mass M. Accordingly, the vehicle mass M is not determined continuously in the manner described. Continuous validation of the exact vehicle mass M while driving is therefore not provided, so that the mass determination is simplified overall.

However, a rough plausibility check of the vehicle mass M can be carried out at regular intervals even when the driving operating mode FB is activated, for example by determining a disturbing force FS during load pauses, for example when changing gear, and on the basis of this individual mass values MWi are at least estimated during load phases using Newton's second law. However, there is no active intervention in the driving process as in the learning operating mode EB for this plausibility check.

It is understood that the foregoing description is that of the preferred embodiments of the invention and that various changes and modifications may be made thereto without departing from the spirit and scope of the invention as defined in the appended claims.

LIST OF REFERENCE SIGNS (PART OF THE DESCRIPTION)

1 vehicle
1a towing vehicle
1b semi-trailer
2 electronic braking system
3 electronic drive system
4 electronic steering system
5 central control unit
6 sensor arrangement
6a camera
7 mass estimation unit
8 wheel of the self-driving vehicle 1
9 wheel revolution rate sensor
13 vehicle frame
15 evaluation unit
17 trailer coupling
17O open position of the trailer coupling 17
17G closed position of the trailer coupling 17
18 vehicle axle
19 load
20 brake
20a service brake
20b continuous brake
20c engine brake
21 brake control system
27 loading opening
28 load space
30 drive
31 drive control system
35 drive train
A vehicle acceleration
A8 wheel acceleration
AW acceleration value
AW1 first acceleration value
AW2 second acceleration value
C cloud system
dt1 first period
dt2 second period
D torque
EB learning operating mode
F internal force
FA driving force
FB driving operating mode
FS disturbing force
FV deceleration force
FW force value
FW1 first force value
FW2 second force value
FWS disturbing force value
GW limit value
I operating information
I1 trailer status change information
I2 loading opening status change information
I3 level change information
I4 loading plan information
I5 loading activity information
I6 load loss information
I7 remote information
I8 position information
L longitudinal direction
LT loading activity
M vehicle mass
MW mass estimate
MWi individual mass value
MWM mean mass value
N wheel revolution rate
Ö public road traffic
P index
P1 first phase
P2 second phase
R remote system
SB brake signal
ST trigger signal
t time
TSoll target trajectory
TE trigger event
TW tolerance value
U vicinity
V losses in the drive train 35
STB, STA, STE steps of the method

The invention claimed is:

1. A method for determining a vehicle mass of a self-driving vehicle wherein an internal force is applied to the self-driving vehicle via an automated control of an electronic drive system having at least one of:
i) a drive; and,
ii) an electronic braking system having a brake;
the method comprising the steps of:
determining whether a trigger event is present, wherein the trigger event indicates that a change in the vehicle mass of the self-driving vehicle is likely;
activating a learning operating mode in the presence of a trigger event, wherein the self-driving vehicle is operated in the learning operating mode alternately in a first phase and in a second phase, wherein by at least one of
i) automated control of the electronic drive system and
ii) the electronic braking system:
in the first phase, an internal force having a first force value is exerted on the self-driving vehicle; and,
in the second phase, an internal force with a second force value is exerted on the self-driving vehicle, wherein the first force value is different from the second force value;
determining a disturbing force acting in the first and second phases; and,
determining the vehicle mass in dependence upon a vehicle acceleration and the internal force present in the respective phase, as well as in dependence upon the determined disturbing force.

2. The method of claim 1, wherein the first force value is set to zero in the first phase or the second force value is set to zero in the second phase, so that in the first phase or in the second phase only the disturbing force acts on the self-driving vehicle.

3. The method of claim 2, wherein the automated control of at least one of the following:
   i) the electronic drive system; and,
   ii) the electronic braking system
is carried out with the learning operating mode activated for setting the first force value or the second force value of zero in the respective phase in such a way that at least one of the following applies: i) a drive train of the self-driving vehicle is open; and, ii) any brakes of the self-driving vehicle are released.

4. The method of claim 1, wherein, when the learning operating mode is activated, at least one of the following applies: i) the electronic drive system; and, ii) the electronic braking system is or are specifically controlled by a central control unit in the first phase for a specified first period and in the second phase for a specified second period to set the internal force with the first force value in the first phase, including non-zero, and the internal force with the second force value, in the second phase, including zero.

5. The method of claim 1, wherein with the learning operating mode activated, at least one of the following applies: i) the electronic drive system; and, ii) the electronic braking system is or are controlled for setting at least one of the following: i) a first non-zero force value; and, ii) a second non-zero force value in the respective phase in such a way that a driving force or a deceleration force acts on the self-driving vehicle as the internal force.

6. The method of claim 1, wherein, in the first phase, a first acceleration value for the vehicle acceleration is set due to the setting of the first force value and the presence of a disturbing force and, in the second phase, a second acceleration value for the vehicle acceleration is set due to the setting of the second force value and the presence of the disturbing force.

7. The method of claim 6, wherein, for the purpose of determining the vehicle mass, a mean mass value characterizing the vehicle mass is determined from individual mass values, wherein each phase in which at least one of i) the first force value; and, ii) the second force value is non-zero is assigned at least one individual mass value, wherein the individual mass values result from the first force value or the second force value present in the respective phase and the first acceleration value or the second acceleration value present in the respective phase, taking into account a disturbing force value, wherein the disturbing force value characterizes the disturbing force.

8. The method of claim 7, wherein the disturbing force value:
   results from the first acceleration value, if the first force value is zero in the first phase; or,
   results from the second acceleration value, if the second force value is zero in the second phase; or,
   results from the first acceleration value and the second acceleration value, if the first and second force values are non-zero.

9. The method of claim 7, wherein the individual mass value is determined in dependence upon the disturbing force value characterizing the disturbing force in the phase immediately preceding the phase assigned to the individual mass value.

10. The method of claim 7, wherein the learning operating mode remains activated until individual mass values assigned to different phases lie within a tolerance value around the mean mass value.

11. The method of claim 7, wherein the learning operating mode remains activated until the disturbing force values determined in different phases deviate from each other by less than a limit value.

12. The method of claim 1, wherein the learning operating mode remains activated for at least two first phases and at least two second phases that alternate.

13. The method of claim 1, wherein the determination of whether a trigger event is present is carried out in dependence upon operating information of the self-driving vehicle, wherein the operating information contains at least one element selected from the following:
   i) trailer status change information, which indicates whether a trailer coupling of the self-driving vehicle has changed between an open position and a closed position; and;
   ii) loading opening status change information indicating whether a loading opening to a load compartment of the self-driving vehicle has been opened or closed; and;
   iii) level change information indicating whether there has been a change in the distance between at least one of the vehicle axles and a vehicle frame of the self-driving vehicle; and,
   iv) loading plan information indicating whether and when a load should be picked up or delivered by the self-driving vehicle as scheduled; and;
   v) loading activity information, which indicates whether loading activities are perceived in an environment of the self-driving vehicle, and wherein this is carried out, including via a sensor arrangement, which includes a camera via which loading activities in the environment can be perceived; and;
   vi) loss of load information indicating whether an unintentional loss of the load from the self-driving vehicle has been detected, including while driving, wherein this is carried out including via the sensor arrangement that includes the camera that can detect the loss of the load from the self-driving vehicle; and,
   vii) remote information indicating whether a cloud system or other remote wireless system has been used to wirelessly communicate a pick-up or delivery of the load by the self-driving vehicle; and,
   viii) position information indicating whether the self-driving vehicle is away from public road traffic including at a depot.

14. The method of claim 13, wherein the operating information is used to evaluate whether the change in the vehicle mass is likely and a trigger signal is output if it has been determined that the change in the vehicle mass is likely, wherein the trigger signal is used to determine whether a trigger event is present.

15. A central control unit comprising:
   a non-transitory computer readable medium having program code stored thereon;
   said program code being configured to determine a vehicle mass of a self-driving vehicle wherein an internal force is applied to the self-driving vehicle via an automated control of an electronic drive system having at least one of:
      i) a drive; and,
      ii) an electronic braking system having a brake;
   wherein said program code is configured, when executed by said processor, to:

determine whether a trigger event is present, wherein the trigger event indicates that a change in the vehicle mass of the self-driving vehicle is likely;

activate a learning operating mode in the presence of a trigger event, wherein the self-driving vehicle is operated in the learning operating mode alternately in a first phase and in a second phase, wherein by at least one of
i) automated control of the electronic drive system and
ii) the electronic braking system:
  in the first phase, an internal force having a first force value is exerted on the self-driving vehicle; and,
  in the second phase, an internal force with a second force value is exerted on the self-driving vehicle, wherein the first force value is different from the second force value;

determine a disturbing force acting in the first and second phases; and, determine the vehicle mass in dependence upon a vehicle acceleration and the internal force present in the respective phase, as well as in dependence upon the determined disturbing force.

16. A self-driving vehicle comprising:
an electronic braking system;
an electronic drive system;
a control unit configured to carry out a method for determining a vehicle mass of a self-driving vehicle wherein an internal force is applied to the self-driving vehicle via an automated control of an electronic drive system having at least one of:
  i) a drive; and,
  ii) an electronic braking system having a brake;
the method including the steps of:
determining whether a trigger event is present, wherein the trigger event indicates that a change in the vehicle mass of the self-driving vehicle is likely;
activating a learning operating mode in the presence of a trigger event, wherein the self-driving vehicle is operated in the learning operating mode alternately in a first phase and in a second phase, wherein by at least one of
i) automated control of the electronic drive system and
ii) the electronic braking system:
  in the first phase, an internal force having a first force value is exerted on the self-driving vehicle; and,
  in the second phase an internal force having a second force value is exerted on the self-driving vehicle, wherein the first force value is different from the second force value;
determining a disturbing force acting in the first and second phases; and,
determining the vehicle mass in dependence upon a vehicle acceleration and the internal force present in the respective phase, as well as in dependence upon the determined disturbing force; and, the self-driving vehicle further including:
said central control unit being configured to control said electronic braking system and said electronic drive system in the presence of the trigger event in an activated learning operating mode in such a way that the self-driving vehicle alternately operates in the first phase and in the second phase, by automated control of at least one of the electronic drive system and the electronic braking system by the central control unit:
in the first phase, the internal force having the first force value on the self-driving vehicle can be set; and,
in the second phase, the internal force having the second force value on the self-driving vehicle can be set, wherein the first force value differs from the second force value; and,
the central control unit being configured to determine the disturbing force acting in the respective phase and to determine the vehicle mass depending on the vehicle acceleration and the internal force that are present in the respective phase as well as the disturbing force.

* * * * *